United States Patent
Lee et al.

(10) Patent No.: US 12,284,229 B2
(45) Date of Patent: Apr. 22, 2025

(54) AUTONOMOUS DYNAMIC WEBSITE AUTOMATION FOR HEALTH CARE WEB PORTALS WITH RANDOM CONTENT

(71) Applicant: VOLUWARE, INC., Huntington Beach, CA (US)

(72) Inventors: Dong Jun Lee, Huntington Beach, CA (US); Martin Staszak, Huntington Beach, CA (US); Yisi Chen, Fountain Valley, CA (US)

(73) Assignee: VOLUWARE, INC., Huntington Beach, CA (US)

( * ) Notice: Subject to any disclaimer, the term of this patent is extended or adjusted under 35 U.S.C. 154(b) by 0 days.

(21) Appl. No.: 16/932,667

(22) Filed: Jul. 17, 2020

(65) Prior Publication Data

US 2021/0044637 A1    Feb. 11, 2021

Related U.S. Application Data

(63) Continuation-in-part of application No. 16/597,015, filed on Oct. 9, 2019.

(60) Provisional application No. 62/875,317, filed on Jul. 17, 2019, provisional application No. 62/743,502, filed on Oct. 9, 2018.

(51) Int. Cl.
| | |
|---|---|
| H04L 65/402 | (2022.01) |
| H04L 9/32 | (2006.01) |
| H04L 65/1076 | (2022.01) |

(52) U.S. Cl.
CPC ........ H04L 65/4025 (2022.05); H04L 9/3215 (2013.01); H04L 9/3228 (2013.01); H04L 65/1076 (2013.01)

(58) Field of Classification Search
CPC . H04L 65/4023; H04L 9/3215; H04L 9/3228; H04L 65/1076
See application file for complete search history.

(56) References Cited

U.S. PATENT DOCUMENTS

| | | | |
|---|---|---|---|
| 8,341,177 B1* | 12/2012 | Bezbaruah | G06F 16/93 707/769 |
| 2018/0114001 A1* | 4/2018 | Jain | H04L 63/083 |
| 2018/0267847 A1* | 9/2018 | Smith | H04L 67/125 |
| 2021/0185042 A1* | 6/2021 | Sharma | H04W 4/70 |

* cited by examiner

*Primary Examiner* — Sherrod L Keaton
(74) *Attorney, Agent, or Firm* — ONE LLP; Jonathan Jaech

(57) ABSTRACT

A system, apparatus and method or controlling an autonomous network communication process includes initiating an automatic algorithm for an interactive communication session with a network node for secure communication with a human user, receiving from the network node a dynamic content including a request for input of information, extracting context information indicating a process for receiving the information needed for continuing the communication session, automatically executing the process for receiving the information, and providing to the network node the information for continuing the secure communication session.

14 Claims, 11 Drawing Sheets

FIG. 5A ⟵ 4100

```
import msexchange_mail as mail
    2FA_code = mail.find_insuranceportal_code()
```

FIG. 5B ⟵ 4200

```
from exchangelib import Credentials, Account
import datetime def find_insuranceportal_code():
    # Specify email address and password
    email_address = venv.configkeys.get('PORTAL_EMAIL_ADDRESS', '')
    password      = venv.configkeys.get('PORTAL_EMAIL_PASSWORD', '')

start_time = (datetime.datetime.utcnow().replace(tzinfo=pytz.utc))

retries = 0
    while retries < 60:
        credentials = Credentials(email_address, password)
    # Login to the email with creds
        account = Account(email_address, credentials=credentials, autodiscover=True)

# Fetch emails from inbox order by received time in descending order
        q = account.inbox.all().order_by('-datetime_received')[:10]
        for email in q:
            email_subject = email.subject
            # See if the keyword VALER looking for is in the email's title
            if 'Passcode' not in email_subject:
                continue
            # If title match, get email body
            email_body = email.body
            email_received_time = email.datetime_received
            timediff = (start_time - email_received_time).total_seconds()

# Finds email within last 15 minutes
            if ('Passcode' in email_subject) and (-900 < timediff < 0):
                abc = email_body.find('Time Passcode ')
                2FAcode = email_body[abc+15:abc+21]
                return 2FAcode
        retries += 1
```

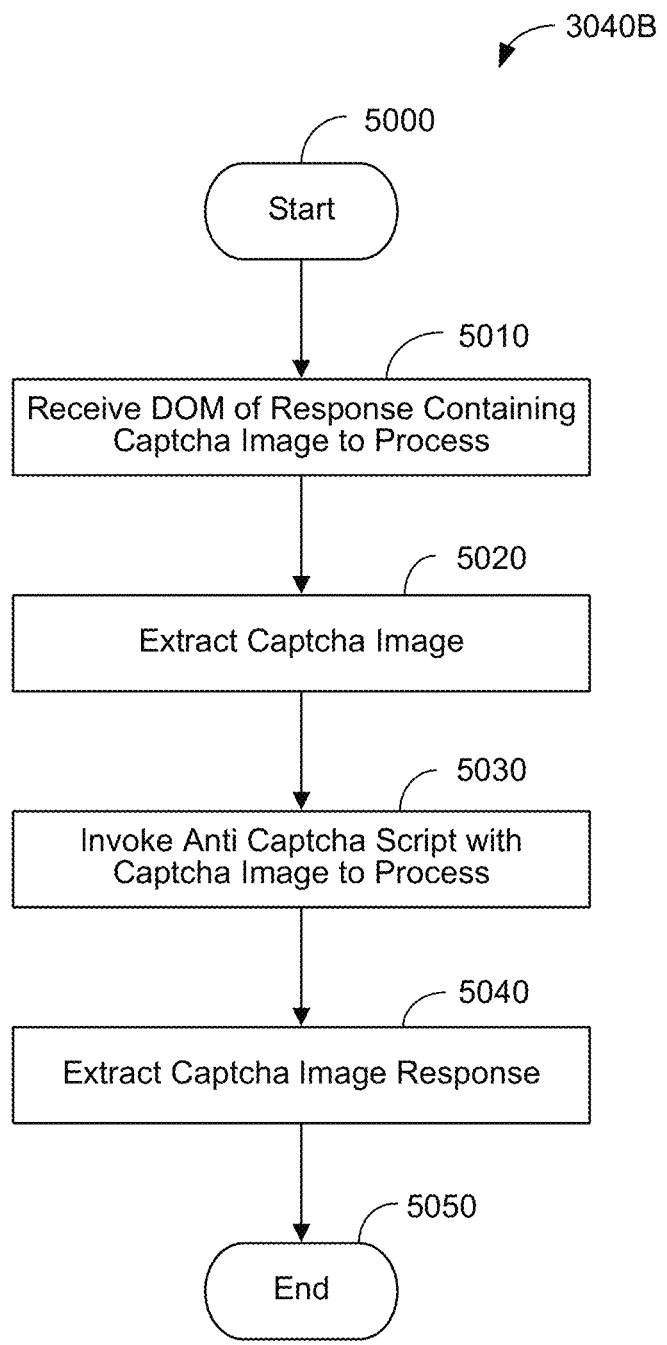

FIG. 7A

```
                                                    ← 5100
┌─────────────────────────────────────────────────────────────┐
│                                                             │
│ def process_captcha(image_base64=None):                     │
│                                                             │
│     create_task_data = {'clientKey': anticaptcha_api_key,   │
│ 'task': {'type': tasktype}}                                 │
│     if tasktype:                                            │
│         if tasktype == 'ImageToTextTask':                   │
│             img_base64 = kw.get('img_base64', '')           │
│             create_task_data.update({'task': {'type': tasktype,│
│ 'body': str(img_base64), 'numeric': 1}})                    │
│         elif tasktype == 'NoCaptchaTaskProxyless':          │
│             sitekey, siteurl = kw.get('sitekey', ''),       │
│ kw.get('siteurl', '')                                       │
│             create_task_data.update({'task': {'type': tasktype,│
│ 'websiteKey': sitekey, 'websiteURL': siteurl}})             │
│         else:                                               │
│             venv.vlog.error('[ANTICAPTCHA CREATE_TASK] Task │
│ type {} not caught.'.format(tasktype))                      │
│             return None                                     │
│                                                             │
│         create_task_post =                                  │
│ requests.post(url=anticaptcha_create_task_url,              │
│ json=create_task_data)                                      │
│         create_task_post_response = create_task_post.json() │
│         if str(create_task_post_response['errorId']) == '0':│
│             return create_task_post_response['taskId']      │
│         else:                                               │
│             venv.vlog.error('[ANTICAPTCHA CREATE_TASK] Uncaught│
│ errorId. Response: {}'.format(str(create_task_post_response)))│
│                                                             │
└─────────────────────────────────────────────────────────────┘
```

*FIG. 7B*

```
                                                    5200 gettaskresult_data = {'clientKey': anticaptcha_api_key, 'taskId':
taskid}
tasktype_wait_dict = {'ImageToTextTask': {'maxretries': 12,
'waitinterval': 5},
                     'NoCaptchaTaskProxyless': {'maxretries': 24,
'waitinterval': 10}} retries = 0
maxretries = tasktype_wait_dict.get(tasktype).get('maxretries')
waitinterval = tasktype_wait_dict.get(tasktype).get('waitinterval')
while retries < maxretries:
    gettaskresult_post =
requests.post(url=anticaptcha_get_task_result_url,
json=gettaskresult_data)
    gettaskresult_post_response = gettaskresult_post.json()
    if str(gettaskresult_post_response['errorId']) == '0' and
str(gettaskresult_post_response['status']) == 'ready':
        if tasktype == 'ImageToTextTask':
            return gettaskresult_post_response['solution']['text']
```

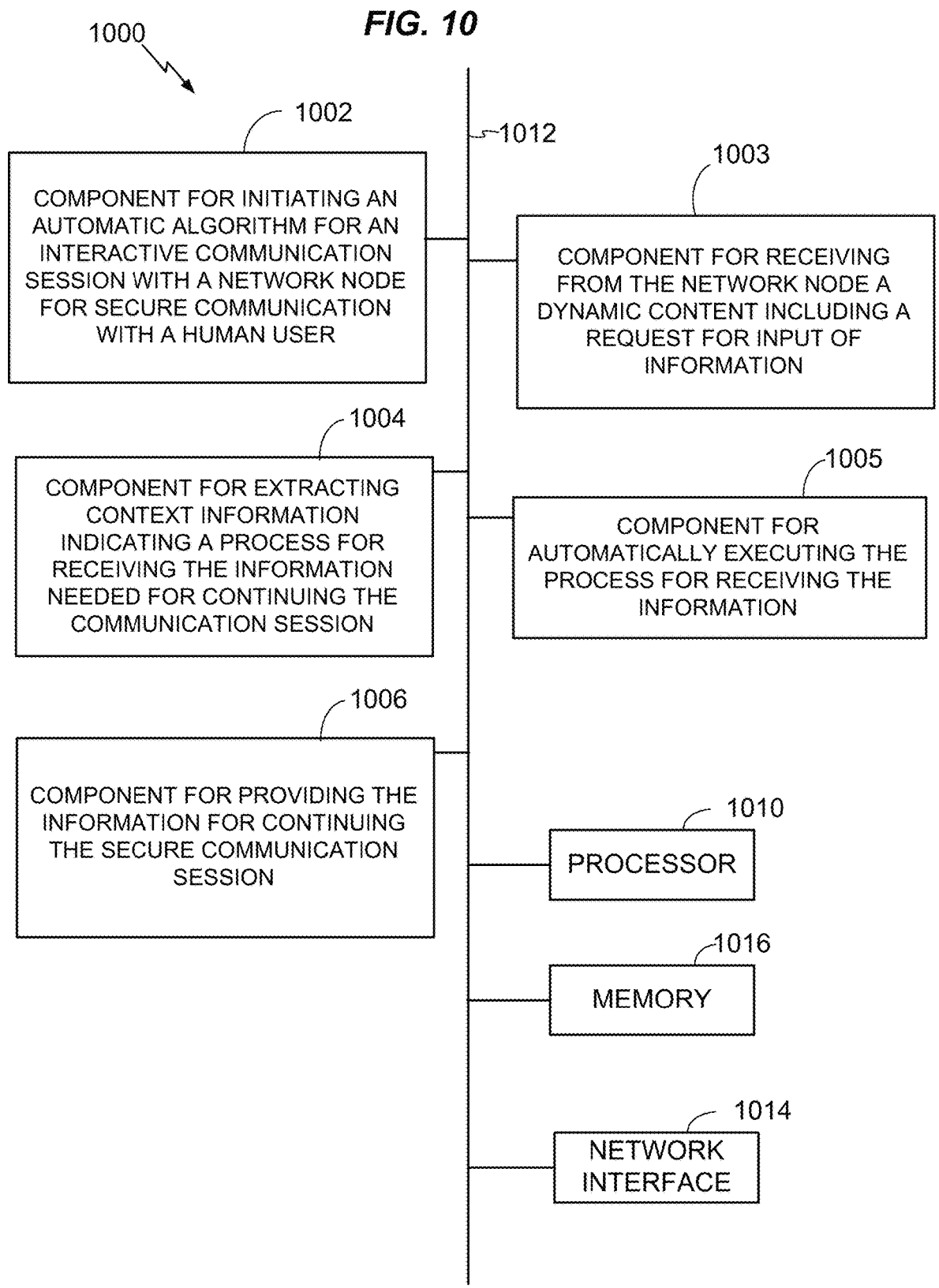

AUTONOMOUS DYNAMIC WEBSITE AUTOMATION FOR HEALTH CARE WEB PORTALS WITH RANDOM CONTENT

CROSS-REFERENCE TO RELATED APPLICATION

This application claims priority pursuant to 35 U.S.C. § 119(e) to U.S. Provisional Application No. 62/875,317 filed Jul. 17, 2019, and is a continuation-in-part of U.S. application Ser. No. 16/597,015 filed Oct. 9, 2019, which claims the benefit of Provisional Application No. 62/743,502 filed Oct. 9, 2018, the disclosures of each of which are hereby incorporated by reference in their entireties.

FIELD

The present disclosure relates to methods and apparatus for autonomous website interactions, for example automation of interactions with web portals that present dynamic content.

BACKGROUND

Web portals, or web sites as they are commonly known, provide a means for human users to access information over the Internet. The process of presenting the information to the human user is commonly called rendering, and web sites make use of different types of controls that make human interpretation of the information more meaningful. Familiar controls are drop down lists where data can be selected, or calendar controls where dates can be visualized. Web site controls, and for that matter, web sites themselves, are under continuous development and improvement as speed of access and ease of use are essential for human acceptance; otherwise, humans won't use the web site.

Web sites are often used to collect data from a user in order to provide a service. Any web page that supports a search capability has a control for the user to enter a search criteria, and the web site will display information related to the search data entered. Some web sites provide very rich services. For example, a site like Travelocity will allow a user to enter in data for dates and destinations, and then it will respond with flight options matching that criteria entered by a user. Many web sites collect credit card information in order to provide a billing service.

A "headless browser" is a software program that can be controlled with configuration and additional programmatic instructions to interact with a website without any human user involved. Those skilled in the art are familiar with PhantomJS, as one example, which is an implementation of a headless browser, though there are others. A browser is referred to as "headless" when it does not render any information to a human user and all of its interaction with a web portal is under software control. A headless browser can inspect HTML to identify controls to interact with, push data into controls, click buttons, and navigate around, again, even though no user is actually involved in the interaction.

The use of a headless browser to automate web portal interaction is sometimes referred to as "web scraping" or "scraping." For example, headless browsers are commonly used in testing web portals so that a service provider can ensure that a web site under development is responding to user inputs with meaningful responses for both valid and invalid data inputs. A headless browser typically interacts with a single website, and can typically mimic any user interaction.

An "Internet bot," or "bot," is an application used to interact autonomously with web portals and it may or may not make use of a headless browser. Many web site developers, for reasons including web site performance or web site data privacy, may include features designed to discourage the effectiveness of a bot at being able to gather information from a website. These features, such as Captcha, and the use of two factor authentication, are designed to ensure that a real human user is driving the interaction with a web site.

For the purposes of this disclosure, "website automation," "web portal automation," "portal automation," "website interaction automation," or "portal interaction automation" refers to a process of using a headless browser to script the interaction of a human user on a website where:

1. a human user's credentials are used to access the site, and
2. the human user has a legitimate account and legitimate business purpose to access the site.

Under this definition, the series of interactions with the portal taken by the automation are not distinguishable from the common actions and permitted use of the human user on the site. Further, the data inputs reflect the intent of the human user, and the data collected is for the sole usage of the human user. In this way, the portal automation is a time-saving and labor saving device for the human user.

Many web site developers have competing requirements. Ease of use requirements that drive making site usage as fast and easy as possible are in conflict with data privacy requirements that motivate the inclusion of forced human interaction features that inevitably make a web site more time-consuming to use.

Two factor authentication and Captcha represent two well-known examples of forced human interaction requirements that create problems for portal automations, but they are not the only ones. Many service providers have complex data sets and data access rules that can change at any time. Some service providers will present questionnaires where the set of questions and the format of responses cannot be known in advance by a portal automation designer.

It would be desirable, therefore, to develop new methods and other new technologies for interactive website automation, for overcoming these and other limitation of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a computer-implemented method for controlling an autonomous network communication process may include initiating, by one or more processors executing an automatic algorithm, an interactive communication session with a network node for secure communication with a human user. The method may include receiving, by the one or more processors from the network node, a dynamic content including a request for input of information. The method may include extracting, by the one or more processors, context information indicating a process for receiving the information needed for continuing the communication session. The method may include automatically executing, by the one or more processors, the process for receiving the information, and providing, by the one or more processors to the network node, the information for continuing the secure communication session.

In an aspect, the autonomous network communication process may include a headless browser, and the dynamic content may be embedded in a web page.

The information may be, or may include, a session passcode, for example, a passcode assigned or registered to the human user or cohort of users for accessing and uploading information from and to a user account. Extracting the context information may include identifying, by the one or more processors based on the dynamic content, a separate communication channel registered to the human user for receiving the session passcode. In various embodiments, the separate communication channel may be one or more of an email address, an SMS address, or an authenticator application. Automatically executing the process for receiving the information (passcode) may include accessing the separate communication channel registered to the human user, analyzing a message from a source associated with the dynamic content, and distinguishing the session passcode in the message. Providing the information may include providing the session passcode to the network node.

The information may be, or may include, a response to a CAPTCHA challenge. Extracting the context information may include identifying a type of the CAPTCHA challenge. Automatically executing the process for receiving the information may include sending the CAPTCHA challenge to an external resource and receiving a response to the CAPTCHA challenge from the external resource. Providing the information may include sending the CAPTCHA response to the network node.

An apparatus for performing the method may include a processor coupled to a memory and to a network interface for communicating with the network node and other nodes. The memory may hold program instructions, that when executed by the processor, cause the apparatus to perform operations of the methods as described herein. In other embodiments, operations of the method may be distributed among two or more separate components of a system.

Advantages of the innovative methods, apparatus and systems may include: the ability to start and pause a headless browser or similar automation process; for a paused automation process to engage other autonomous processes capable of producing a contextual correct response, pass data in the form of a request to obtain a response from an autonomous process, process the response from the autonomous process to obtain the data necessary to continue a portal automation, and restart the automation process using the data from the autonomous process response. Moreover, the technology is not restricted to pre-determined stopping points; thus, it may be stopped and restarted numerous times, allowing for a series of iterations to be performed to reach a successful endpoint. Still further, the method and system is not restricted to any specific data formats, and can work with any service interface that supports a request/response transaction semantic.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIGS. 5A and 5B illustrate examples of program code showing further details of the method of FIG. 4.

FIG. 6 is a flow chart illustrating aspects of automating a method for applying the method of claim 3 to resolving an image CAPTCHA challenge.

FIGS. 7A and 7B illustrate examples of program code showing further details of the method of FIG. 5.

FIG. 10 is a block diagram illustrating an apparatus for performing the process diagrammed in FIG. 9, and any other method disclosed herein.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are shown in block diagram form to facilitate describing these aspects. Those having ordinary skill in the art may be able to make alterations and modifications to what is described herein without departing from its spirit and scope. Therefore, what is illustrated is set forth only for the purposes of example and should not be taken as a limitation on the scope of the present apparatus and its method of use.

Figure 1:
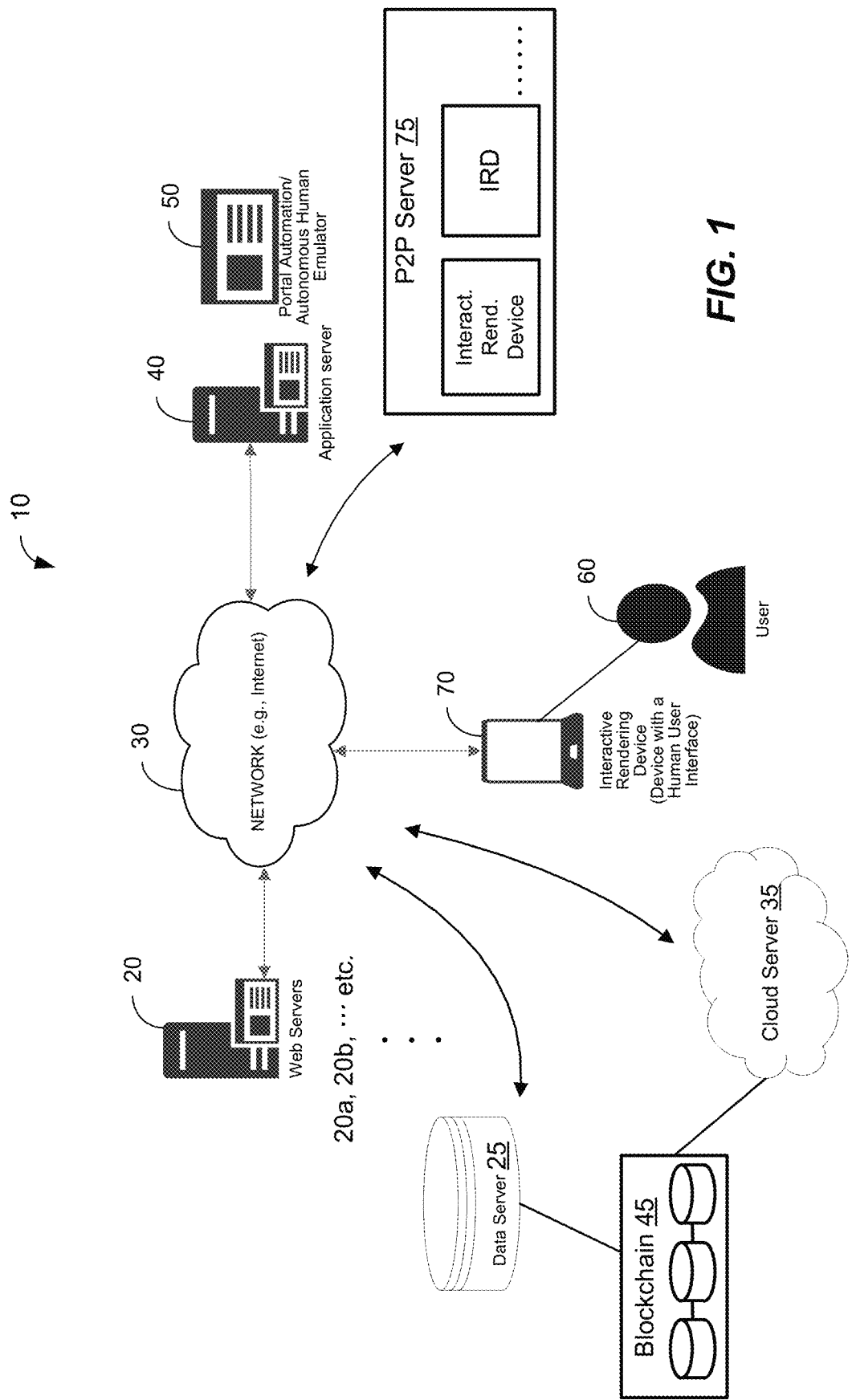
FIG. 1 is a schematic block diagram illustrating aspects of a system and apparatus for controlling an autonomous network communication process in accordance with an embodiment of the present disclosure.

FIG. 1 illustrates aspects of a computer-based system for controlling an autonomous network communication process, for example, a headless browser automation 10 according to an embodiment of the present disclosure. In an aspect, the system 10 may include computer servers such as a number of web servers 20 communicably coupled to (hereinafter "coupled to," which includes both direct and indirect, and physical and logical, connections between two or more referenced entities) a network 30 such as the Internet, and serving web pages or other information configured for enabling human interactivity via an input-output terminal on the network 30. The web servers may also be referred to as web portals. The system 10 also includes one or more application servers 40 coupled to the network 30 and interacting programmatically with web servers 20 using one or more portal automations 50 running on and/or accessible by the application servers 40. Optionally, the system 10 may include one or more interactive rendering devices 70 coupled to the network 30 and accessible by one or more human users 60 for interacting with the portal automation 50 or web servers 20 when needed. The system 10 may also include a data server 25, a cloud server 35, and/or a peer-to-peer (P2P) server 75 coupled to the network 30. P2P server may include an interactive rendering device 71, an interactive rendering device 72, and so on. The data server 25 and the cloud server 35 may be coupled by a blockchain 45. Other architectures may also be suitable.

The portal automation component 50 may be configured for execution by the application server 40, and may emulate human interaction with one or more web pages or other human-interactive content served by the web servers 20, 25, 35, etc., eliminating the need for human interaction whenever possible. In an aspect, the portal automation component may operate as an authorized agent of a user, performing time-consuming interactions with any one or more of the servers 20, 25, 30, etc., as may often be required in certain professions. For example, in the medical profession, providers may desire to seek reimbursement from multiple different insurers via corresponding web portals. The portal automation component 50 may be configured with knowledge (stored data) kept securely on the provider's behalf for accessing the provider's accounts with multiple web services, greatly reducing the amount of staff time needed to interact with the insurance portals. Similar applications for the technology may exist in other fields.

In an aspect, the network 30 includes one or more networks, for example a Wide Area Network (WAN) 30 (e.g., the Internet) and/or a wireless communication network (WCN), for example a cellular telephone network, using any suitable high-bandwidth wireless technology or protocol, including, for example, cellular telephone technologies such as 3rd Generation Partnership Project (3GPP) Long Term Evolution (LTE), 5G fifth-generation cellular wireless, Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof.

In some instances, the servers and other network entities (collectively referred to as "nodes") connect directly, dynamically and non-hierarchically to as many other nodes as possible and cooperate with one another to efficiently route data from/to client devices. This lack of dependency on one node allows for every node to participate in the relay of information. Mesh networks dynamically self-organize and self-configure. The servers can connect to client devices in a server-client structure. Some client devices can also act as servers. As used herein, a "network node" means a server configured for communicating with other servers over a network.

In an aspect of the present disclosure, each of the one or more web servers 20 may be a device having one or more processors, memory, an operating system, input/output interfaces, and a network interface, and running a program (e.g., Apache Tomcat, NGINX, Windows IIS, and so forth) that supports communication using the HTTP protocol including any of its current and future variants (e.g., HTTP 1.0, HTTP 1.1, and HTTPS). While a web server 20 commonly responds to requests on ports 80 or 443, in some instances, the web server 20 may be configured to run on any port on a computing device. In an aspect, the portal automation 50 interacts with the web service 20 using the HTTP protocol, and the interaction may be carried out, for example, by the portal automation 50 sending HTTP request messages to the web server 20, and by the web server 20 communicating back to the portal automation 50 using HTTP response messages.

In an aspect, the interactive rendering device 70 is a device running a computer program that is capable of interacting with a human user 60, where interaction consists of the rendering device 70 communicating information to the human user 60 and collecting responses from the human user 60. System 10 of an embodiment of the present disclosure may include one or more output devices, e.g., a visual display and/or speaker for rendering information visually or audibly or both, and one or more input devices, such as a trackpad, a keyboard, a mouse, a microphone, a touchscreen, etc. In an aspect, the interactive device 70 encompasses any device with a man-machine interface. Nonetheless, the portal automation component may be configured to reduce the need for end user participation as much as possible, and may entirely eliminate the need for human involvement in many interactions with the web servers.

Interactive rendering devices 70 (client devices) may include, for example, smartphones, smartwatches, voice response systems (incl. smart speakers), computers designed for use by humans with disabilities, brain-computer interfaces (BCIs), portable electronic devices (incl. wearable devices), notepad computers, tablets, laptop computers, personal computers, and special-purpose human interface devices such as vehicle media control units with or without touch screens or voice recognition systems installed as part of vehicular electronic systems, and so forth.

Computer servers including web servers 20 and/or application servers 40 may be implemented in various architectures. For example, the environment 10 may include one or more application servers 40 containing documents and application code compatible with World Wide Web protocols, including but not limited to HTML, XML, PHP (PHPDoc) and JavaScript documents or executable scripts, for example. The environment 10 may include one or more data servers 25 and/or cloud server 35 for holding data such as personal data including patient data, medical data, insurance plan benefits data, etc., including text, video, audio-video, audio, graphical content components, medical charts or history, prior authorization requests, for consumption using a client device or for an essential data exchange between an web portal (e.g., insurance payer portal) and a service provider (e.g., a healthcare provider); for holding software for execution on or in conjunction with application server 40, for example portal automation applications as described herein, and data collected from users 60 or interactive rendering devices 70. Data collected from interactive rendering devices 70 or users 60 for use by the automation portal 50 may include, for example, user identity, user profile (user profile data), insurance benefits data, and application data. User identity, user profile, and insurance data may be collected by a background (not user-facing) application operating on the interactive rendering device 70, and transmitted to the application server 40. Application data means application state data, including but not limited to records of user interactions with an application on an application server 40 or web portals 20, or other inputs, outputs or internal states from interacting with the application server 40 or web portals 20 or other servers. Applications may include software for interactive scraping, autonomous response to dynamic content requests from a server, and supporting functions. Applications and data may be served to one or more system nodes including interactive rendering device 70 or portal automation 50 from one or more of the foregoing servers (e.g., 20, 25, 35, 40) or other types of servers, for example, any server accessing a distributed blockchain data structure 45, or a peer-to-peer (P2P) server 75 including a peer-to-peer network such as a mesh network (including partial, full, and wireless mesh networks), such as may be provided by a set of interactive rendering devices 71, 72, etc., and the like, operating contemporaneously as micro-servers or clients.

In an aspect, information held by one or more of the data server 25, cloud- based server 35, distributed blockchain data structure 45, or P2P server 75 may include a data structure of user data, which may include, but not limited to, data components such as patient data, medical records, medical history, insurance benefits, primary insurance, secondary insurance, in-network benefits, out-of- network benefits, deductibles, out-of-pocket amounts, co-pays, prior authorization requests, clinical necessity, financial responsibility, clinical services, insurance claims, pre-existing conditions, family history, utilization management data, etc. The data structure may relate user-perceivable aspects of user data to identifiers of the user data. For example, in an aspect, the data structure may do so by using profile values, and/or one or more indicators of semantic meaning relevant to one or more data components, and other unique metadata sets characterizing each of the components.

The network environment 10 may include various devices (such as devices 70, 71, 72, . . . , etc., collectively referred to as interactive rendering devices 70), for example an autonomous or connected vehicle, digital signage, information/payment kiosk, automated teller machine, electronic ticket counter, etc., that may be connected to servers via the network 30, and the like. In general, device 70 may be, or may include or communicably connected to, computers used by users to access data content provided via a server or from local storage.

In an aspect, the system 10 according to an embodiment of the present disclosure includes a public Internet as part or all of the network 30, but the network may not be limited to the public network, or presence of a physical network. In an aspect, the portal automation 50 can interact with one or more web servers 20 using HTTP message. Physical networks may include, for example, telephone lines, coaxial wires, ethernet cables, optical cables and the electric field, and the network nodes may contain hardware to send and receive signals over one or more of these physical strata. Operating systems use a variety of techniques to simplify the use of physical hardware by other software programs, which includes providing services for other programs to use that logically represent physical networks. Software programs thus interact with the operating system for the purposes of sending and receiving messages. The operating system has the logic to determine if messages result in the exchange of data over a physical network interface, or if the messages are transferred between two software programs on the same node or device. In some embodiments, the portal automation 50 can interact with an interactive rendering device 70. In other embodiments, the application server is provisioned with all necessary user information in advance, and does not need to communicate with the user 60 during performance of autonomous interactions with other servers.

In an aspect, the web server 20, a portal automation module 50, and a rendering program on a rendering device 70 are all software programs that may be executed by one or more processors of servers, nodes, and/or devices in the system 10 and not constrained to a specific hardware arrangement. In an aspect, the system 10 is not necessarily limited to the presence of separate servers and nodes or devices interacting over the Internet 30. In another aspect, the system 10 may include web servers 20, portal automation 50, and optionally, interactive rendering devices 70, all running on the same device with no physical network. In another aspect, the nodes 20, 50 and 70 can be on separate devices or the same device in any combination, and in cases where there is a physical network for any of 20, 50 or 70 to interact with one another, the network 70 can be any network, including private networks, with the only requirement that a web server be present on the network that supports a HTTP protocol.

Figure 2:
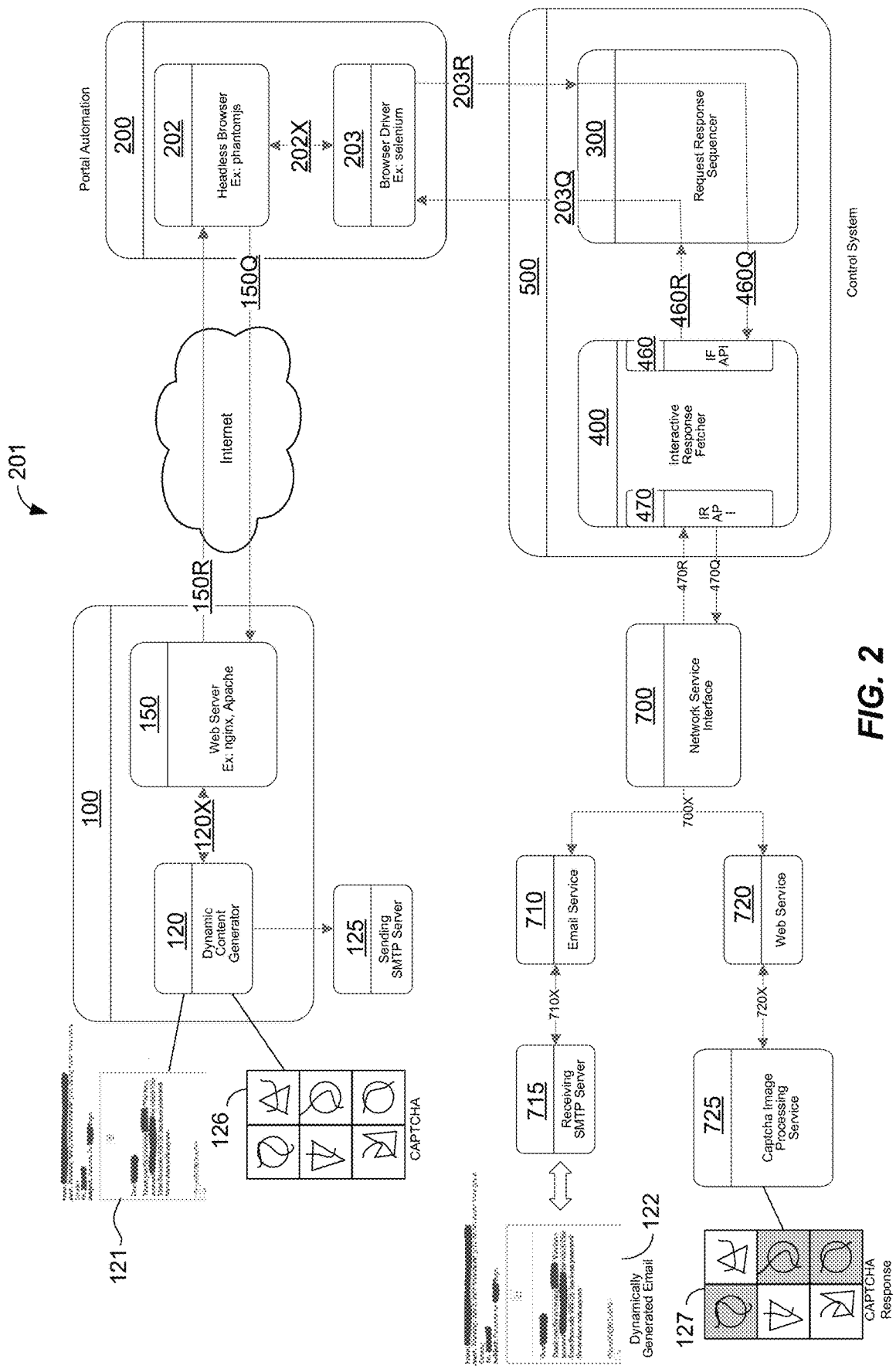
FIG. 2 is a schematic block diagram illustrating aspects of the system and apparatus for automation of interactions with web portals with dynamic contents in accordance with an embodiment of the present disclosure in more detail.

FIG. 2 illustrates more detailed aspects of the system 10 according to an embodiment of the present disclosure. The server(s) 20, 25, 35, 45, 75 of FIG. 1, singly or collectively, is/are represented as a web portal 100, which includes the web server program 150 and a dynamic content generator 120. In an aspect, the interface 120X between the dynamic content generator 120 and the web server program 150 is logical only and intended to show that there is some facility for the web server 150 to provide one or more dynamic contents 101 in response to an HTTP message that it receives.

In an aspect, the dynamic content 101 is a dynamic web content such as a dynamically generated web content, including but not limited to, a questionnaire in the form of a web page. Dynamic content may be adaptive content, or personalized content, or both. As used herein, the term, "dynamic content" refers to any information contained in an HTTP response, of any content-type, for which a portal automation does not have logic or data to continue a predefined script of interaction without engaging another facility, such as a human user or an autonomous process that emulates a human user, to provide necessary and sufficient logic or data to continue.

In an aspect, the present disclosure includes a system for handling any type of dynamic content produced by a web portal 100. Those skilled in the art of web programming and portal automation understand that HTTP responses include a content-type that can be a wide range of data formats and data values. The art of portal automation involves the use of information in HTTP responses.

In an aspect, the system 10 uses what is known as the DOM (Document Object Model), to find controls on a web page which may or may not include a dynamic content, presented by a web portal 100 and manipulate them programmatically. The DOM is a document object model standard originally developed by W3C (World Wide Web Consortium) and later taken over by WHATWG (Web Hypertext Application Technology Working Group). DOM is an object-oriented representation of a web document (HTML, XML. Etc.) that acts as an interface between a webpage scripting language (e.g., JavaScript) and the web document itself. DOM can define the properties, methods, and events of an HTML element (node). In an aspect, DOM is a tree-like representation of the contents of a webpage, i.e., a tree of nodes (objects representing a part of the web document) with various relationships depending on their arrangements in the web document. The present disclosure, however, is not restricted to the use of DOM (W3C) for portal automation, and other variants, modifications, or related technologies for manipulating contents of a webpage may be used. Alternatively, web portals 100 may support interactivity and dynamic content using other content-types (e.g., JSON, XML, free text, etc). In an aspect, visual DOM (HTML) and/or other content-types may be used for the body of the requests and responses. In an aspect, the dynamic content generator 120 can produce other content types, and the web server 150 can support other request bodies. For example, servers 100 may support a program supported by a representational state transfer (REST) protocol, such as a REST API, and the process of submitting a prior authorization may involve a sequence of REST API calls without any visual DOM (HTML), but rather, such content-types can be considered as non-visual DOM. For example, instead of a visual DOM, JSON data may be used instead. Hereinafter, these technologies including visual and non-visual DOM are collectively referred to as "DOM."

Still referring to FIG. 2, the system 10 includes portal automation 50 of FIG. 1, now referred to as portal automation 200. In an aspect, the portal automation 200 may include a headless browser application 202, for example a PhantomJS, Headless Chrome driver, or similar application, and a programmatic interface to the headless browser called a headless driver 203, such as Selenium or other application. In an aspect, the headless browser 202 manipulates the DOM by activating controls, entering data into elements that support input, and stimulating buttons that result in the execution of JavaScript programs embedded in the web page. In some instances, DOM manipulation results in HTTP requests being sent to the web portal 100, represented in FIG. 2 as the interface 150Q. The HTTP protocol is designed as a request/response arrangement, and the headless browser 202 processes HTTP responses represented as 150R from the web portal 100.

Headless browser technology provides one aspect of the functionality necessary to perform portal automation. In an aspect, a second technology component referred to as a headless driver 203 is also required, where Selenium is a known example. For example, headless driver 203 provides the programmatic interface to the headless browser 202 so other programs, such as the control system 500 shown in FIG. 2, can use function calls to access and inspect elements of the DOM, enter data into control elements that support inputs, and perform operations that a human user can or would typically perform using a keyboard and mouse (or other user interface) on a web page, to be performed by the headless browser 202.

In an aspect according to an embodiment of the present disclosure, interface 203Q represents a set of functions provided by the Python Selenium module available for control systems 500 to use. The interface 203R represents an output of the function calls for control systems 500 to process.

In an aspect, portal automation 200 is a series of function calls represented as interface 203Q being made to the headless driver 203, which results in the headless browser 202 performing DOM manipulation of a certain form, and returning the DOM manipulation results to the browser driver 203 over interface 202X which in turn are provided back to a control system 500 in the form of a function output represented as interface 203R.

In an aspect, the interface 202X between the headless browser 202 and the headless driver 203 is a Web Driver Interface in compliance with a W3C standard (https://w3c.github.io/webdriver/). In some aspects, while Selenium provides the headless driver 203 function in certain embodiments, a control system 500 may also choose to interact directly with a headless browser 202 over the interface 202X when the headless browser 202 conforms to the interface standard of the headless driver 203, such as the W3C standard or other suitable standards.

Still referring to FIG. 2, the system 10 of the present disclosure includes a control system 500, which embodies an interactivity aspect of the present disclosure. In an aspect, the control system 500 may be instantiated on the same application server 40 as some or all aspects of the portal automation 200, or may be instantiated on a separate component or node. The control system 500 may include functional logic components such as a request response sequencer 300 and an interactive response fetcher 400. The request response sequencer 300 initiates a connection and sends requests to a web portal 100 by using functions provided by the headless driver 203, represented as interface 203Q.

Figure 3:
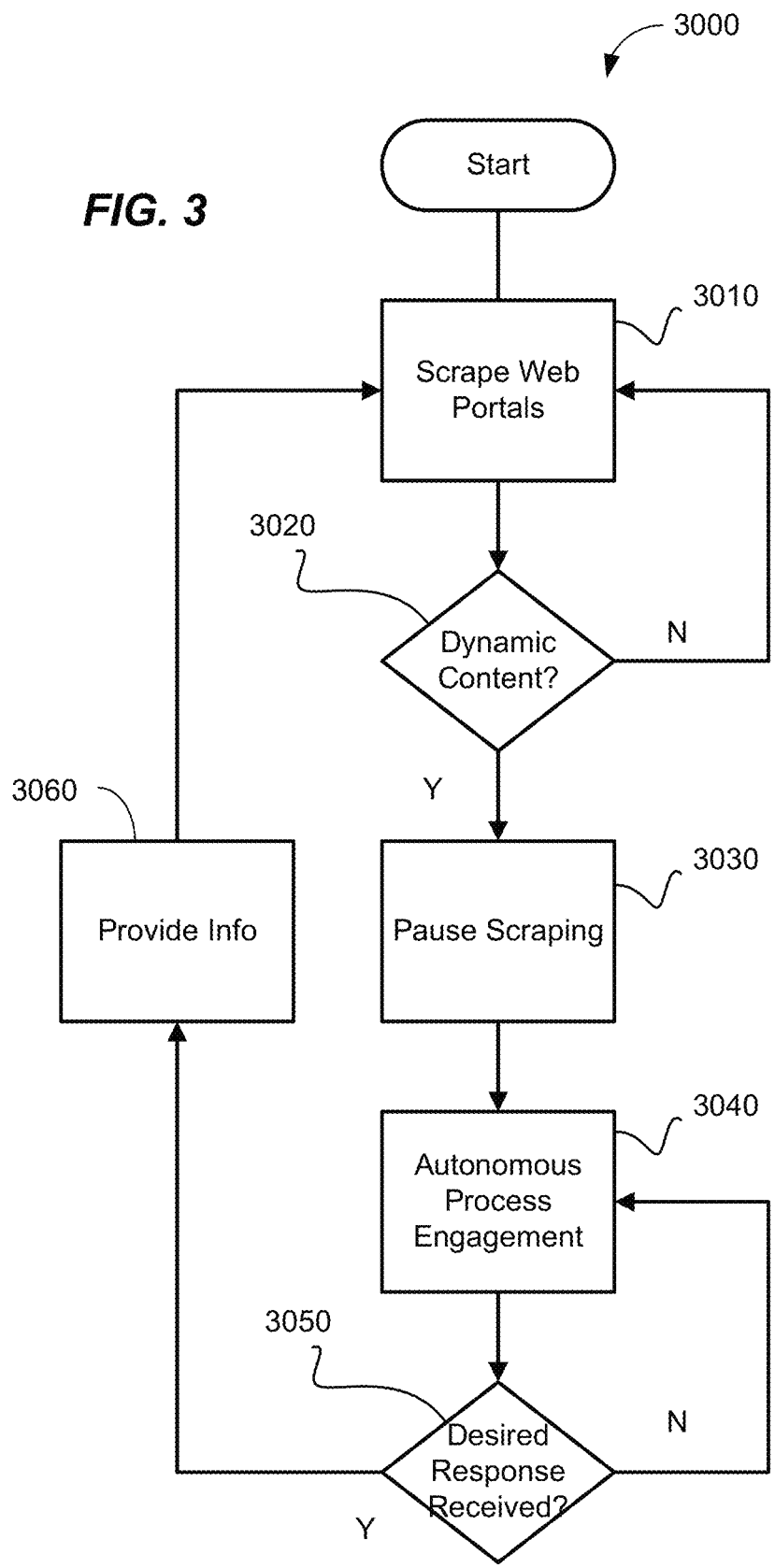
FIG. 3 is a flow chart illustrating high-level aspects of a method for automation of interactions with web portals with dynamic contents in accordance with embodiments of the present disclosure.

Referring to FIG. 3, aspects of a computer-implemented method 3000 for automating interactions normally needed a human response in the system are illustrated in a high-level process flowchart. Further variations and details of the method are disclosed in the remainder of the disclosure. In an aspect, the method 3000 starts at 3010 where one or more processors (hereinafter individually or collectively, "processor") perform scraping of one or more web portals (e.g., web portal 20 of FIG. 1). If dynamic content is encountered by the processor while scraping at 3020 (e.g., running the request response sequencer 300 of FIG. 2), the processor then pauses the scraping at 3030. The processor then engages one or more of the autonomous processes described below in connection with FIG. 4, 5 or 9 at 3040 to obtain an automated response (e.g. HTTP response) from the autonomous process. Once the desired response is obtained from the autonomous process at 3050, the processor supplies the relevant portion of the response to the web portal at 3060 and resumes scraping of the web portal using the received response at 3010. The processor may continue web scraping a list of web portals until all tasks are completed or no further progress can be made (not shown).

Figure 4:
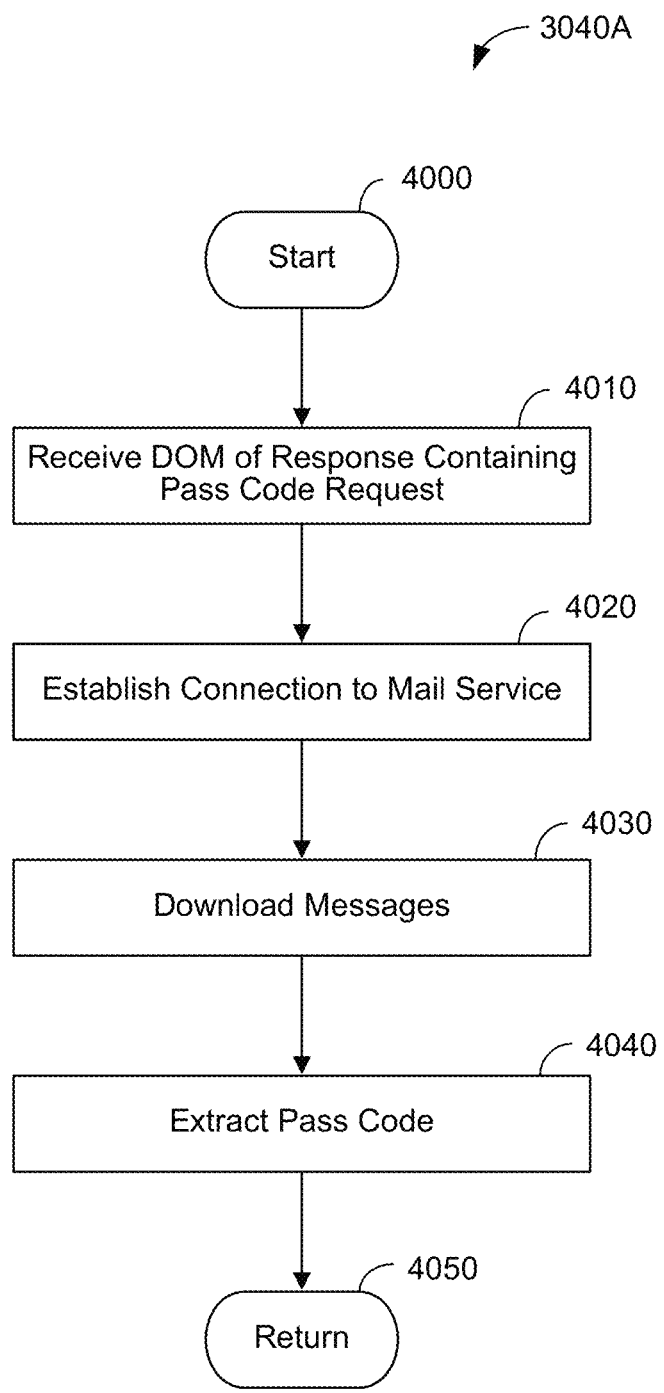
FIG. 4 is a flow chart illustrating aspects of automating a method for applying the method of claim 3 to retrieving a passcode delivered via email for the purpose of supporting multi-factor authentication.

Referring to FIG. 4 and FIG. 6, aspects of the engagement of an autonomous process are described for two use cases: retrieving a passcode delivered via email for the purpose of supporting multi-factor authentication (FIG. 4), and resolving a Captcha phrase (FIG. 6).

Referring to FIG. 4, in the use case context of passcode retrieval, the process 3040A for autonomous response using email service for multi-factor authentication processing starts at 4000 in response to a call at 3040 of FIG. 3. At 4010, the processor may receive the DOM of a webpage, or equivalent information, containing an input control for a user to enter a passcode that has been sent to an address (e.g., email or SMS number) known to be under control of the user by the health insurance web portal 100 as part of the operation of the dynamic content generator 120. Examples of a dynamically generated email 121 containing a passcode, and a passcode form 122 containing an input control for user entry of a passcode are provided in FIG. 2.

At 4020, the processor pauses the portal automation process and establishes a connection to an email or other message server to obtain the passcode-bearing email sent by the dynamic content generator 120 to the user address. In embodiments, the mechanism to connect to the email server may be a Python module providing programmatic access to email services, for example email service 710 (FIG. 3).

In an aspect, the processes for connecting to an email server 4020, retrieving email messages 4030, and extracting a passcode from an email message 4040 may be combined. For example, in an embodiment of the present disclosure, a Python module "msexchange_mail" has a function "find_insuranceportal_code" that returns a passcode to the processor. The "find_insuranceportal_code" function implementation in an embodiment of the present invention handles all three sub processes 4020, 4030 and 4040 (as reproduced in FIG. 4) in sequential fashion. The processor may import the Python module "msexchange_mail" and invoke the function "find_insuranceportal_code." Further details regarding the module "msexchange_mail" and process flow that it causes when executed by the processor should be apparent to a programmer of ordinary skill by inspection of the code segment 4100 shown in FIG. 5A.

In another aspect, execution of the "find_insuranceportal_code" function by the processor may cause the apparatus to perform the functions 4020, 4030, and 4040, culminating in the return of the passcode to the calling process. The processes 4020, 4030 and 4040 may be coded as shown in the source code segment 4200 of FIG. 5B. Return of the passcode is shown at the penultimate line stating "return 2FAcode". Further details regarding the module "find_insuranceportal_code" and process flow that it causes when executed by the processor should be apparent to a programmer of ordinary skill by inspection of the code segment 4200 shown in FIG. 5B.

In an aspect, once the processor receives the 2FAcode in response to the call to "find_insuranceportal_code", the request response sequence 300 restarts the portal automation by using the browser driver 203 to send the keystrokes representing the act of a user entering a passcode into the passcode form 122, when returning 4050 to block 3060 of FIG. 3.

Referring to FIG. 6 relating to a use case context of Captcha processing the process 3040B for autonomous response using web service for captcha processing starts at 5000 in response to a call at 3040 of FIG. 3. At 5010, the processor receives the DOM of a webpage or equivalent information containing an input control for a user to perform a task that is easy for most humans but computationally intensive for machines, for example, entering a phrase matching a Captcha image, or identifying semantic content in a matrix of images 126 produced by the dynamic content generator 120. Examples of a dynamically generated Captcha image 126 and a web form 127 containing an input control for user entry of a Captcha response are provided in FIG. 2.

At 5020, the processor pauses the portal automation process to extract the Captcha image from the DOM or equivalent information. At 5030, the processor uses a process of invoking an Anti-Captcha script to process the Captcha image obtained at 5020 for the purpose of obtaining a valid Captcha response from the Captcha image processing service 725 (FIG. 2). In an embodiment of the present invention, the Anti-Captcha script is a Python module, and the interface the processor uses to interact with the web service is a function call. The Python module includes programmatic logic for both the web service 720 and to interact with a Captcha processing service 725 via interface 720X. In an aspect, the protocol interface 720X is the HTTP protocol.

For example, in an embodiment of the present disclosure, a Python module "anticaptcha" has a function "process_captcha", which takes an input image_base64, and the processor 300 invokes the function by passing the Captcha image 126 once converted by a base64 encoding scheme. At 5040, in the foregoing embodiment, a processor executing the function "process_captcha" orchestrates a series of interactions with the Captcha image processing service, in a design pattern often referred to as a script, to obtain a Captcha response from the service. The process, at 5040, is divided into two parts. The first part presents the Captcha image to the service using a programming implementation of an HTTP POST in the statement "create_task_post=requests.post( . . . )". The response to the HTTP POST request contains contextual information for the second part. An example of programmatic instructions 5100 for the first part are shown in FIG. 7A. Further details regarding the module "process_captcha" and process flow that it causes when executed by the processor should be apparent to a programmer of ordinary skill by inspection of the code segment 5100 shown in FIG. 7A.

In the second part, a processor executing the script repeatedly makes requests to Captcha image process 725 (FIG. 2) until the response on the protocol exchange includes a Captcha response. An example of programmatic instructions 5200 for the second part are shown in FIG. 7B. In an aspect, at the second part of 5040, in an embodiment of the present disclosure, the Captcha response delivered by the Captcha image processing service 5040 is delivered to the processor 500 in the return statement "return gettaskresult_post_response['solution']['text']". Further details regarding the second part and process flow that it causes when executed by the processor should be apparent to a programmer of ordinary skill by inspection of the code segment 5200 shown in FIG. 7B. Once the request response sequencer 300 (FIG. 2) obtains the Captcha image response, the request response sequencer 300 restarts the portal automation by using the browser driver 203 to send the keystrokes representing the act of a user entering a Captcha response into the web form 127.

The code examples 4100, 4200, 5100 and 5200 are in the Python scripting language. Any suitable coding language may be used to instruct a processor to perform the same or equivalent functions.

Web Automation Example—Prior Authorization Requests with One Time Passcode Entry:

In an aspect, the system 10 of the present disclosure involves use of the request response sequencer 300, which utilizes portal automation 200, to automate the process of data or financial transactions online. One example involves submitting prior authorization requests to health insurance web portals (e.g., web portals 20) on behalf of health care providers and facilities ("Providers"). Typically, a health insurance company requires a prior authorization request from a Provider for a medical or health service to be performed for a patient that is a member of the health insurance plan provided by the health insurance company, before deciding to make payment on medical or health services rendered/to be rendered by the Provider to the member patient, in accordance with insurance plan benefits that the member patient may be entitled to. Health insurance companies and Providers are recognized as Covered Entities within the framework of the Health Insurance Portability and Accountability Act, known widely by the acronym HIPAA. Covered Entities are required to comply with HIPAA Administrative Simplification Regulations which were formulated with the express intent to secure the privacy of patient data. HIPAA Administrative Simplification Regulations include specific technical requirements covering the exchange of data through web portals, including data encryption, password strength, password aging and rotation policies, and so forth. Health insurance portals often include additional levels of security to protect the integrity of user accounts, and ensure that sites are protected from infiltration by automated internet scanning programs called web robots, commonly known as "bots". These additional levels of security include device whitelists, multi-factor authentication, or the use of Captcha as part of the authentication process.

Referring again to FIG. 2, in accordance with an embodiment of the present disclosure, the request response sequencer 300 uses portal automation 200 to script the process of submitting a prior authorization through a health insurance web portal 100. The request response sequencer 300 begins by attempting to login to health insurance web portal 100 by using interface 150Q to enter valid credentials for the health insurance web portal 100.

The health insurance company expert system 120 generates a dynamic content 121 in the form of an email containing a one-time passcode, which is transmitted via the sending SMTP server 125 to a user account associated with the credentials being used by the request response sequence 300 to login to the health insurance portal 100. Subsequently, the expert system 120 responds with the passcode entry form 122, which is received by the request response sequencer 300 as a change in the DOM over the interface 203R. In an aspect, the request response sequencer 300 determines that input of a one-time passcode is required to continue.

The request response sequencer 300 pauses its current request response processing and uses the interactive response fetcher 400 to engage an email service 710 via network service 700.

In an aspect, the request response sequencer 300 uses a logical application programming interface IF API 460 for the interactive response fetcher 400 to obtain the data necessary to respond with a passcode for the passcode entry from 122. In an aspect, the IF API 460 can be any form of logical interface, including a function call, a message over a network, etc., depending on the form of communication that the interactive response fetcher 400 undertakes. In an aspect, the interactive response fetcher 400 is a program supported by a representational state transfer (REST) protocol, such as a REST API, and the request response sequencer 300 uses HTTP messages to send and receive data from the interactive response fetcher 400.

In an aspect, the interactive response fetcher 400 engages the email service 710 using its IR API 470. In an aspect, the IR API 470 can be any form of logical interface, such as a function call, a message over a network, etc., depending on the form of communication that network service 700 takes. For example, in an aspect, network service 700 is an email service 710 embodied as a Python module, and the IR API 470 is a function call. In an aspect, the interactive response fetcher 400 pushes contextual information in the form of the user context and target health insurance web portal received from the request response sequencer 300 over 460Q to the email service 710 as variable data and function calls in a Python module.

In an aspect, email service 710 uses a programmatic interface in the form of a Python module to establish a connection with receiving SMTP server 715, and retrieves an email containing the one-time passcode required by the request response sequencer 300. In an aspect, email service 710 uses various algorithmic strategies, including knowledge of the expected sender and computed optimal time windows to locate the correct email message to return to request response sequencer 300.

In an aspect, the interactive response fetcher 400, the network service 700, the email service 700 and the receiving SMTP service 715 can be logically combined in a single Python module in an optimized implementation. In an aspect, the passcode can be obtained by processing a set of emails within the optimized Python implementation, and once obtained, is returned to the request response sequencer 300 over 460R.

In an aspect, the dynamic response processing according to an embodiment of the present disclosure concludes with the request response sequencer 300 extracting the one time passcode received via HTTP response 460R, and then the control system 500 restarting the scraping process on the portal automation 200 using the received data 460R. In some aspects, while Selenium provides the headless driver 203 function in certain embodiments, the control system 500 may also choose to interact directly with the headless browser 202 over the interface 202X, as previously discussed.

Web Automation Example—Prior Authorization Requests Requiring Captcha Response:

Referring again to FIG. 2, in accordance with an embodiment of the present disclosure, the request response sequencer 300 uses portal automation 200 to script the process of submitting a prior authorization through a health insurance web portal 100. The request response sequencer 300 begins by attempting to login to health insurance web portal 100 by using interface 150Q to enter valid credentials for the health insurance web portal 100.

The health insurance company expert system 120 generates a dynamic content 126 in the form of a Captcha image. The expert system 120 sends a response over HTTP response 150R with the Captcha image along with a Captcha response form 127, which is received by the request response sequencer 300 as a change in the DOM over the interface 203R. In an aspect, the request response sequencer 300 determines that a correct response to the Captcha response form is required to continue.

The request response sequencer 300 pauses its current request response processing and uses the interactive response fetcher 400 to engage a web service 720 via network service 700.

In an aspect, the request response sequencer 300 uses a logical application programming interface IF API 460 for the interactive response fetcher 400 to obtain the correct response to complete the Captcha form 127.

In an aspect, the interactive response fetcher 400 engages the web service 720 using its IR API 470. In an aspect, the IR API 470 can be any form of logical interface, such as a function call, a message over a network, etc., depending on the form of communication that network service 700 takes. For example, in an aspect, network service 700 is a web service 720 embodied as a Python module, and the IR API 470 is a function call. In an aspect, the interactive response fetcher 400 pushes contextual information in the form of the Captcha image 126 received from the request response sequencer 300 over 460Q to the web service 720 as variable data and function calls in a Python module.

In an aspect, the Captcha image processing service 725 is supported by a representational state transfer (REST) protocol, such as a REST API, and the web service 720 uses 720X in the form of HTTP requests and responses to exchange data with the Captcha image processing service 725. In an aspect, web service 720 passes the Captcha image received as programmatic input over 470Q to the Captcha image processing service 725, and forwards the response obtained from the Captcha image processing service 725 back to the request response sequence 300 using the return paths 470R and 460R respectively.

In an aspect, the dynamic response processing according to an embodiment of the present disclosure concludes with the request response sequencer 300 extracting the Captcha response received via HTTP response 460R, and then the control system 500 restarting the scraping process on the portal automation 200 using the received data 460R to supply the correct response to the Captcha form 127. In some aspects, while Selenium provides the headless driver 203 function in certain embodiments, the control system 500 may also choose to interact directly with the headless browser 202 over the interface 202X, as previously discussed.

Current State of Art: The current process that most healthcare providers and facilities ("Providers") endure to request prior authorization is as follows: 1. Assemble supporting clinical materials for patient, and 2. Prepare form supplied by payer and submit via fax with clinicals to payer, OR login to payer web portal, fill out portal screens, upload clinical materials.

Providers typically have a mix of 5 to 200 payers, of which 2 to 50 may have their own payer portals. Therefore, Providers could be logging into several, even dozens of portals, over the course of one day while submitting prior authorizations for their patients. This requires different login credentials for each portal. Despite the electronic nature of portals, Providers still cannot aggregate their data without resorting to a separate record keeping mechanism that requires duplicative/redundant work.

In an aspect, the system and method of the present disclosure ("VALER") acts like a "superportal." Through VALER, which already contains the patient data as well as the clinical documentation, the Provider may enter the prior authorization information into the superportal, and VALER brings back any relevant information. In an aspect, once the Provider has used VALER to do the prior authorization submission, Providers can see real time data about submission into payers without the Provider having to do anything else but submit prior authorizations into the superportal.

In an aspect, VALER is customized to the Provider's use. In an aspect, VALER provides a central database of Provider information designed to the Provider's specifications. In an aspect, the central database customized to such specifications can still communicate with the payer portals, which in turn have their own portal specifications. In an aspect, VALER's centralized storage of information optimizes Provider resources but also provides real time aggregation of patient data.

The Importance of a Single Data Repository for Tracking:

The requirement to use multiple portals to carry out financial transactions poses more than just a labor cost problem. A prior authorization is characterized by an intrinsic state, nominally, pending, approved or denied, the most common among a number of possibilities. Disposition of the prior authorization request is often not immediate. It is common for a request to be submitted, and then provider staff must periodically check back on the payer portal to determine the state of the request.

A second problem with the requirement to use multiple portals is also the difficulty in generating an accurate report regarding the disposition of prior authorization requests in progress. Since the information regarding the status of the authorizations are distributed across many payer portals, the current solution for tracking the disposition of requests is to manually enter information into a separate tracking system for the purpose of reporting.

A separate tracking system has a number of disadvantages. First, manual data entry is duplicative work. Second, the potential for errors from manual data entry is significant, both in terms of the timeliness of the data entered as well as the accuracy of the information. Third, prior authorization requests carry a lot of context information in the form of patient and physician demographics. These data elements must also be continuously synchronized as well for the reports to be meaningful.

In an aspect, an automation platform such as VALER has a complete data set, solving the problem of manual entry of tracking data. In an aspect, VALER has real time status of all requests in progress, no separate tracking system is needed. For the tracking data to maintain its integrity, it is necessary that all prior authorizations be processed to completion through the portal automation. In the case, for example, where a portal automation was unable to successfully run to completion due to a website introducing dynamic content, then the automation cannot gather essential data from the payer portal, including assigned payer authorization numbers, the initial status of the authorization request, or visual artifacts such as an authorization summary page required to be provided at the time of billing.

Another operational problem solved by having an automation and a single data repository relates to cost estimates and budgeting. The current (conventional) manual process requires health care providers to carry many staff people to carry out the prior authorization work. Individual workers can have high variance in efficacy, and providers need productivity reports in order to make projections on the cost required to scale their operations. Capturing data in order to track the length of time individuals take to perform the manual activities is time consuming and labor intensive. Workers are often interrupt-driven, and payer portals can vary in ease of use and response times. Backlog is a common problem, and backlog has a direct impact on patient care delivery.

In an aspect of the present disclosure, an automation that uses a common user interface for all portal interactions solves two problems. First, it normalizes the user experience which eliminates the time variances associated with different payer portals. Second, the automation directly tracks the efficacy of users through all aspects of the process, including how long each stage of the authorization takes as well as how accurate they are with the data entry. In an aspect, VALER provides detailed productivity reports that allow the health care providers to have critical operational insight so that process optimizations can be performed that minimize costs and maximize worker productivity. This solution is only possible as long as VALER continues to have an accurate data set relative to the state of all authorizations across all payer portals.

Non-Obvious User Experience Elements:

Prior authorization requests represent an essential data exchange between an insurance company and a health care provider that falls under the broad category of Utilization Management. Utilization Management in colloquial terms is the set of decisions an insurance company must make around insurance plan benefits. There are two main categories of decisions: clinical necessity and financial responsibility.

Insurance plan benefits can be extremely complex. Primary insurances, secondary insurances, in-network benefits, out-of-network benefits, deductibles, out-of-pocket amounts, the list goes on. Prior authorizations arose as a means for insurance companies to gather data in order to pre-determine whether a set of desired services for a patient were clinically necessary and financially covered before the services are rendered. Approval artifacts are required by insurance companies before they will pay out on a financial claim from a provider.

Currently, there is no standard on which insurance companies have agreed that define the necessary and sufficient data set for an insurance company to accept and process a prior authorization request. The result is that every insurance company prior authorization form is different, and one insurance company does not accept another insurance company's form. The same goes for payer portals. Like insurance company forms, most insurance company websites differ from one another. Often, they differ dramatically.

In an aspect of the present disclosure, the VALER "super-portal" user experience allows a user to supply all the necessary and sufficient data for ANY insurance company portal. Nominally, this requires the ability to capture any data element that may be present on any insurance company form or be required to be entered in any insurance company portal.

In an aspect, the VALER user experience is run-time changeable and run-time adaptable, depending on which insurance company the user wishes to submit an authorization request to. Further, in an aspect, the user experience can only present choices to the user that are valid for a given insurance company context.

For example, assume there is a health care provider that must obtain authorizations from Insurance Company A and Insurance Company B. Insurance Company A contracts with a network of specialists, and Insurance Company B contracts with another network of specialists that partially overlaps with Insurance Company A.

In an aspect, when a user of the VALER selects Insurance Company A, then the list of specialties and the list of specialists presented by VALER must completely match exactly what Insurance Company A supports. Further, if the user made an error and switches the context to Insurance Company B, then VALER must ensure that any selections that are not valid for Insurance Company B must be removed, and the user presented with new choices that only match the possibilities for Insurance Company B.

In some embodiments, physician demographics and specialties are only one example of the ways in which two insurance company portals may differ. In an aspect, VALER takes into consideration the ways in which dozens of insurance company portals can represent information differently to arrive at a single user experience that is capable of being a front-end for all of them.

The introduction of dynamic content within an insurance portal necessitates the development of another layer of non-obvious user experience elements. The responding user that must provide the data entry for a portal automation to continue must have the full context of the operation in progress. Without the full context, it is not possible for the responding user to gather the additional information for an accurate response.

In an aspect, the VALER user interface has been adapted to allow for dynamic content to be integrated into a visual presentation that retains all the original request context. For example, in some embodiments, it is possible for all parts of the original request to be reviewed and evaluated, and there is sufficient information if the user must access other systems such as the health care provider electronic health record system to obtain the data.

The presence of dynamically generated content in the insurance company web portals has had a direct impact on the labor cost associated with the authorization request submission process. Correspondingly, in an aspect, VALER incorporates increasingly more sophisticated automation strategies to offset the rising labor costs. Although in many cases, dynamically generated content in the form of clinical surveys requires a clinician or qualified Provider representative to provide direct responses, one set of strategies involves the use of autonomous processes to fetch responses for dynamically generated content without the need to engage a human user (see, e.g., FIG. 11).

Figure 8:
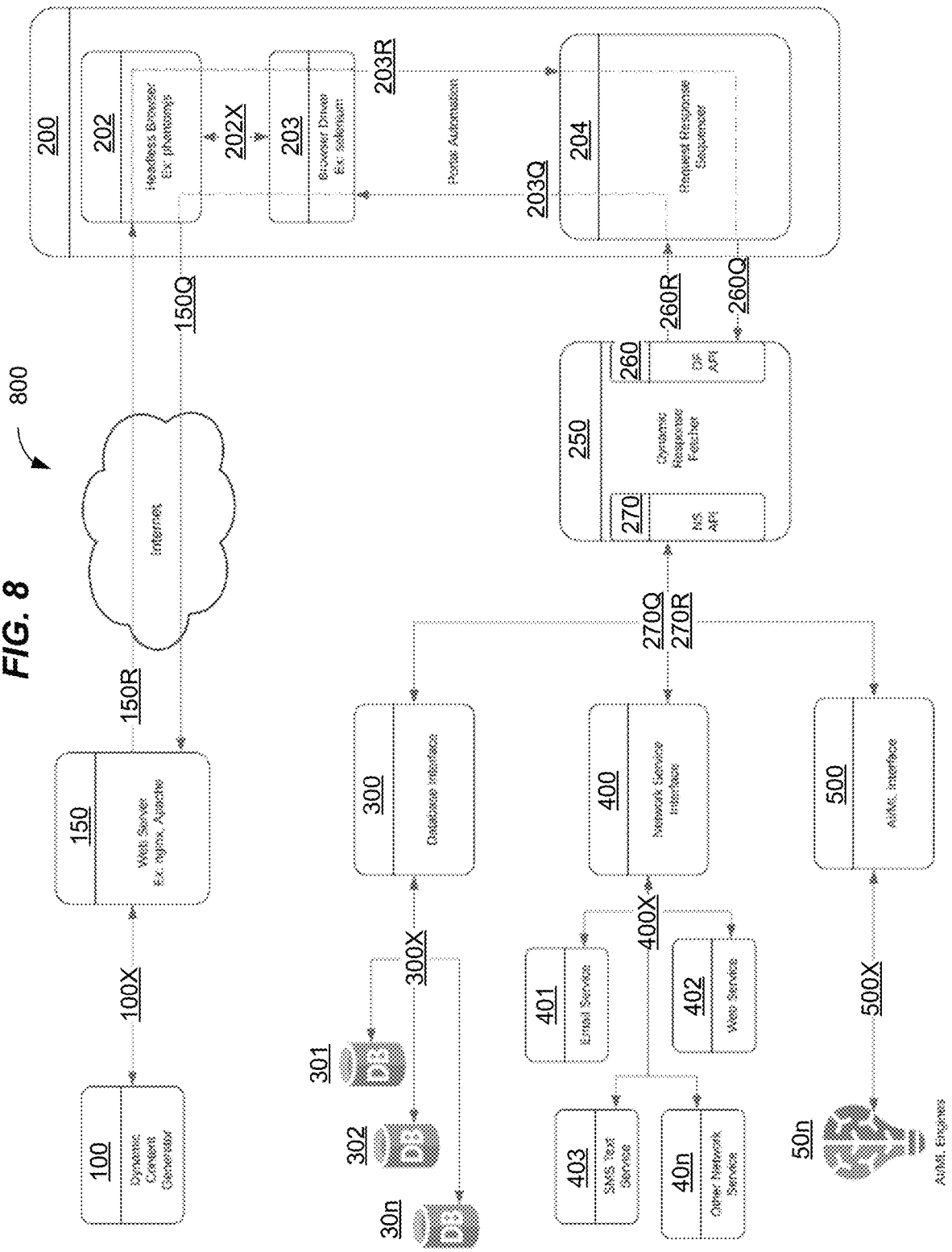
FIG. 8 is a diagram illustrating a conceptual structuring of logical components involved in autonomous dynamic response processing.

Referring to FIG. 8, a conceptual structuring of the logical components 800 involved in autonomous dynamic response processing in accordance with one more embodiments of the present disclosure is shown. Various other ways to organize software in a manner to perform the processes as described may be suitable, and except in the obvious case of messages being passed over the Internet, the interactions between logical components can take the form of function calls, inter-thread or inter-process communications, or even message passing between computers in geographically separate regions.

For example, an autonomous dynamic response (ADR) process may begin with portal automation module 200, triggered by a user and background task initiating a portal submission, may be launched by an external process. The external process configures the portal automation module 200 with information necessary to connect to an instance of a dynamic response fetcher (DRF) module 250. The ADR module 200 may create a headless browser instance 202 and a browser driver instance 203, and may attach the instances 202 to 203 programmatically. The ADR module 200 may further creates a request response sequencer (RRS) module 204 for the target insurance company web portal.

The RRS module 204 may execute a pre-defined sequence of steps required to perform a prior authorization request submission. The ADR module 200 configures the RRS module 204 with information necessary to connect to an instance of the DRF module 250. The RRS module 204 uses the browser driver 203 to connect to the insurance company web portal using a request interface 203Q. Each request sent via 203Q results in a corresponding HTTP/S message being sent by the headless browser instance 202 over the standard interface protocol 150Q for the Internet The insurance company web server 150 processes the incoming requests and passes them to a business logic system 100 called a dynamic content generator (DCG) module 100 via an internal interface 100X. The DCG module 100 responds via the web server 150 with modifications to the HTML DOM and/or other response data, which is propagated through the headless browser 202 and browser driver 203 before arriving at the RRS module 204 as a browser response 203R (generally, a browser event captured by 203).

The RRS module 204 inspects the data in the response 203R by analyzing response data and changes to the HTML DOM it was expecting to receive. The RRS module 204 uses the Request Response process until it completes its sequence of steps, or, it detects a condition ("Dynamic Response Needed") in the HTML DOM that does not match the required initial conditions for the next sequential step.

Part 2—Process for Managing Dynamic Response: The RRS module 204 pauses the request/response sequencing in progress, then engages the DRF module 250 by using 260Q (a request protocol) to send a request for dynamic content. The RRS module 204 passes contextual information in the request that the DRF module 250 can use to engage a service appropriate for fetching a valid response.

The DRF module 250 connects to one or more of a database interface 300, a network service interface 400, or AI/ML 500 interface, using a request protocol 270X which can vary depending on both the nature of the service interface and information being requested. The DRF module 250 receives a response from 300, 400 or 500 over a response protocol 270R, which can vary depending on both the nature of the service interface and information being requested, as appropriate, and forwards the information back to 204 using the response protocol 260R.

The RRS module 204 processes the information from the DRF module 250, incorporating it as one or more steps in the sequence. The module 204 may also re-arrange the remaining steps as needed and restart the portal automation by sending another request to the web server 150 via the response protocol 203Q.

Example—Using dynamic autonomous responses for sites using multi-factor authentication: A common, simple use case for the use of Dynamic Autonomous Responses is for insurance web portals that use multi-factor authentication. In Part 1, the RRS module 204 detects that there is a change to the HTML DOM which includes a control for the user to enter a security code, which has been sent via email to the user associated with the automation. For this case, the DRF module 250 is provided to the RRS module 204 by the portal automation module 200 in the form of a URL and credentials for an email service 400 (web based), or in alternatives, a URL and credentials for a web based SMS text service 403, web service 402 or other network service 40n, via an interface 400X.

The RRS module 204 imports the DRF module 250, which allows it to send and receive messages to the web based mail service 401 or other services 402, 403, 40n. The module may provide several mechanisms to simplify the process or require the RRS module 204 to perform several steps to extract the necessary code from the email.

Using the DRF module 250, the RRS module 204 can find the confirmation email message containing the access code. It extracts the access code, and using the request protocol 203Q, enters the access code into the corresponding HTML DOM element for the control, and then activates the appropriate control to continue with the browser automation sequence.

In an alternative, or in addition, the RRF module 204 may similarly interact with a database interface 300 to fetch information required by the DCG module 100 from an external database, using an interface 300X to access one or more databases 301, 302, 30n to locate and return required information. Likewise, the RRF module 204 may similarly interact with an artificial intelligence/machine learning (AI/ML) interface 500 to access requested data from any one of various AI/ML engines 50n, for example, for solving a CAPTCHA challenge or to emulate any other perceptive computational task required by the DCG 100.

Figure 9:
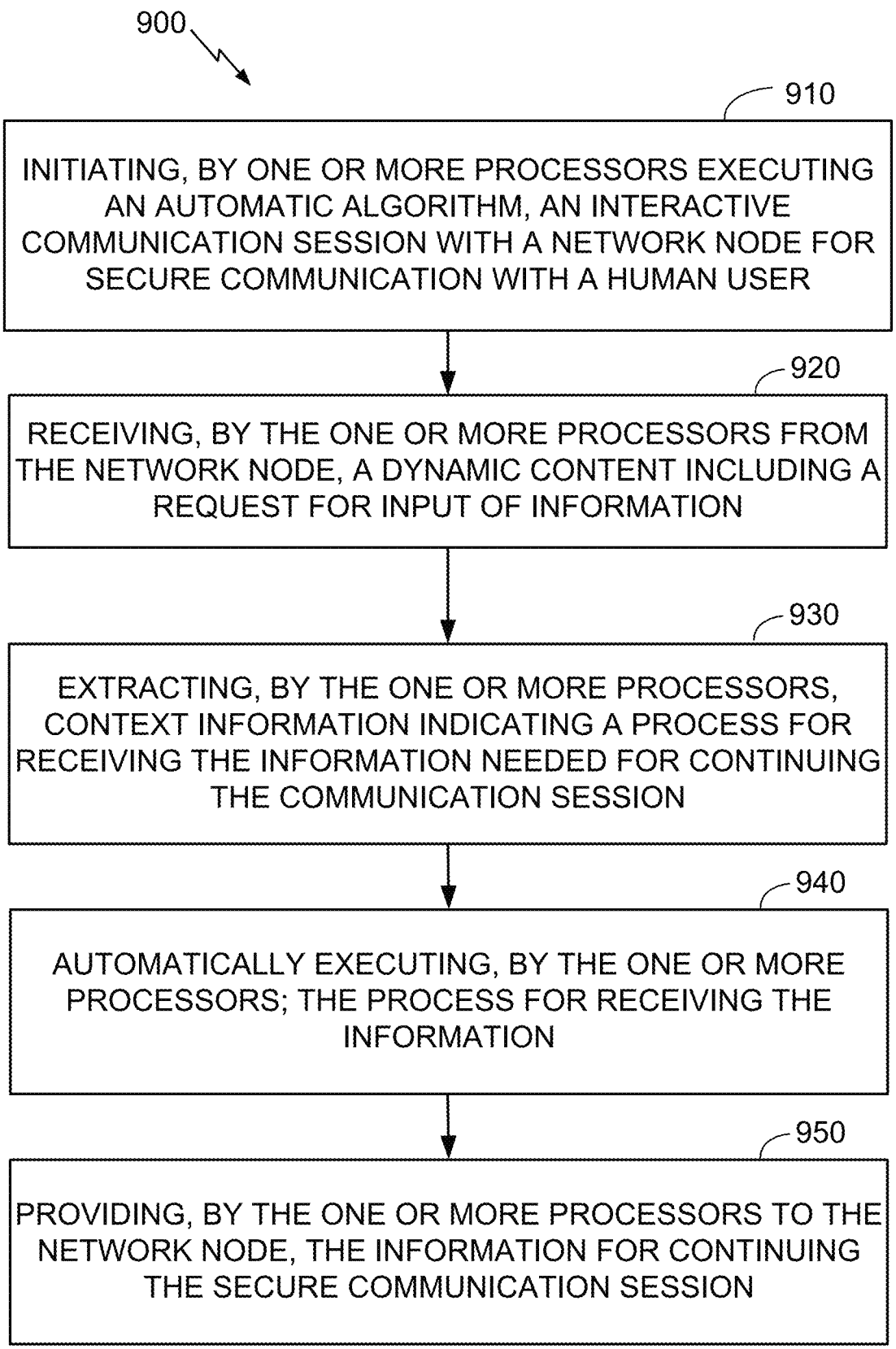
FIG. 9 is a flow chart illustrating another example of operations for automating certain web portal operations designed for human interaction.

Additional example: In accordance with the foregoing disclosure, and by way of additional example, FIG. 9 shows a method 900 that may be performed by a processor of a server for controlling an autonomous network communication process. The method 900 may include initiating 910, by one or more processors executing an automatic algorithm, an interactive communication session with a network node for secure communication with a human user. In an aspect, the autonomous network communication process may include a headless browser, and the dynamic content may be embedded in a web page. In another aspect, the communication session may be one of the insurance claim sessions by a healthcare provider as described above, or any other comparable activity.

At 920, the method 900 may include receiving, by the one or more processors from the network node, a dynamic content including a request for input of information. The information may be, or may include, a session passcode, for example, a passcode assigned or registered to the human user or cohort of users for accessing and uploading information from and to a user account. In alternative embodiments, information may be, or may include, a response to a CAPTCHA challenge, information from a database pertaining or belonging to the authorized user, or a human perceptual input that can be emulated by an AI/ML engine.

At 930, the method 900 may include extracting, by the one or more processors, context information indicating a process for receiving the information needed for continuing the communication session. Extracting the context information may include identifying, by the one or more processors based on the dynamic content, a separate communication channel registered to the human user for receiving the session passcode. In various embodiments, the separate communication channel may be one or more of an email address, an SMS address, or an authenticator application operating on a user-registered machine. In alternative embodiments, extracting the context information may include identifying a type of the CAPTCHA challenge. These and other alternatives may operate as described in more detail in the foregoing disclosure.

At 940, the method 900 may include automatically executing, by the one or more processors, the process for receiving the information. For example, automatically executing the process for receiving the information (passcode) may include accessing the separate communication channel registered to the human user, analyzing a message from a source associated with the dynamic content, and distinguishing the session passcode in the message. In an alternative, automatically executing the process for receiving the information may include sending the CAPTCHA challenge to an external resource and receiving a response to the CAPTCHA challenge from the external resource. These and other alternatives may operate as described in more detail in the foregoing disclosure.

At 950, the method 900 may include providing, by the one or more processors to the network node, the information for continuing the secure communication session. For example, providing the information may include providing the session passcode to the network node. In an alternative, providing the information may include sending the CAPTCHA response to the network node. Other information may likewise be provided for continuing the automated process emulating a human user, once obtained using any suitable process, for which various examples are provided herein above.

FIG. 10 is a conceptual block diagram illustrating components of an apparatus or system 1000 for controlling an autonomous network communication process, according to at least one embodiment. As depicted, the apparatus or system 1000 may include functional blocks that can represent functions implemented by a processor, software, or combination thereof (e.g., firmware).

As illustrated in FIG. 10, the apparatus or system 1000 may comprise an electrical component 1002 for initiating an automatic algorithm for an interactive communication session with a network node for secure communication with a human user. The component 1002 may be, or may include, a means for said initiating. Said means may include the processor 1010 coupled to the memory 1016, and to the network interface 1014, the processor executing an algorithm based on program instructions stored in the memory. Such algorithm may include a sequence of more detailed operations, for example, identifying a user account, identifying one or more web portals to service for the user account, identifying one or more communication tasks to be performed during a session, and connecting to a least one of the one or more web portals, or as otherwise described herein above.

As illustrated in FIG. 10, the apparatus or system 1000 may comprise an electrical component 1003 for receiving from the network node a dynamic content including a request for input of information. The component 1003 may be, or may include, a means for said receiving. Said means may include the processor 1010 coupled to the memory 1016, and to the network interface 1014, the processor executing an algorithm based on program instructions stored in the memory. Such algorithm may include a sequence of more detailed operations, for example, receiving a web page in a markup language, and detecting one or more objects on the page requesting interactive input of information from a user, or as otherwise described herein above.

As illustrated in FIG. 10, the apparatus or system 1000 may comprise an electrical component 1004 for extracting context information indicating a process for receiving the information needed for continuing the communication session. The component 1004 may be, or may include, a means for said extracting. Said means may include the processor 1010 coupled to the memory 1016, and to the network interface 1014, the processor executing an algorithm based on program instructions stored in the memory. Such algorithm may include a sequence of more detailed operations, for example, selecting a process for obtaining requested information based on the type of information requested and if applicable, a communication or data resource supplying the information, using a headless browser and browser driver, or as otherwise described herein above.

As illustrated in FIG. 10, the apparatus or system 1000 may comprise an electrical component 1005 for automatically executing the process for receiving the information. The component 1005 may be, or may include, a means for said receiving. Said means may include the processor 1010 coupled to the memory 1016, and to the network interface 1014, the processor executing an algorithm based on program instructions stored in the memory. Such algorithm may include a sequence of more detailed operations, for example, requesting the information from an indicated resource via an appropriate request protocol, and receiving the information from the resource by a response protocol, with the foregoing managed by a DRF module 250, or as otherwise described herein above.

As illustrated in FIG. 10, the apparatus or system 1000 may comprise an electrical component 1006 for providing the information for continuing the secure communication session. The component 1006 may be, or may include, a means for said providing. Said means may include the processor 1010 coupled to the memory 1016, and to the network interface 1014, the processor executing an algorithm based on program instructions stored in the memory. Such algorithm may include a sequence of more detailed operations, for example, providing the information received from the resource to the requesting web portal via an RRS module and headless browser or as otherwise described herein above.

The apparatus 1000 may optionally include a processor module 1010 having at least one processor, in the case of the apparatus 1000 configured as a data processor. The processor 1010, in such case, may be in operative communication with the modules 1002-1006 via a bus 1012 or other communication coupling, for example, a network. The processor 1010 may effect initiation and scheduling of the processes or functions performed by electrical components 1002-1006.

In related aspects, the apparatus 1000 may include a network interface module 1014 operable for communicating with a node over a computer network. In further related aspects, the apparatus 1000 may optionally include a module for storing information, such as, for example, a memory device/module 1016. The computer readable medium or the memory module 1016 may be operatively coupled to the other components of the apparatus 1000 via the bus 1012 or the like. The memory module 1016 may be adapted to store computer readable instructions and data for effecting the processes and behavior of the modules 1002-1006, and subcomponents thereof, or the processor 1010, or the method 300, 400, 600 or 900 and one or more of any additional operations described in connection with foregoing methods, or disclosed by code snippets of FIGS. 5A-5B and 7A-7B, or in connection with any system described herein above, for example in connection with FIG. 2 or 8. The memory module 1016 may retain instructions for executing functions associated with the modules 1002-1006. While shown as being external to the memory 1016, it is to be understood that the modules 1002-1006 can exist within the memory 1016.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), voice response systems, and other electronic devices both wired and wireless.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other formats). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein, and non-essential operations may be omitted from functional embodiments. Additionally, it should be further appreciated that the methodologies disclosed herein are capable of being stored on an article of manufacture to facilitate transporting and transferring such methodologies to computers.

What is claimed is:

1. A computer-implemented method for controlling an autonomous network communication process, the method comprising:
    initiating, by one or more processors executing an automatic algorithm, an interactive communication session with a network node for secure communication with a human user;
    receiving, by the one or more processors from the network node, a dynamic content including a request for input of information comprising a multi-factor authentication session passcode;
    extracting, by the one or more processors, context information indicating a process for receiving the information needed for continuing the communication session, wherein the information comprises the session passcode, and the extracting further comprises automatically identifying, by the one or more processors based on the dynamic content, a separate communication channel registered to the human user for receiving the session passcode;
    automatically executing, by the one or more processors, the process for receiving the information comprising the session passcode; and
    automatically providing, by the one or more processors to the network node, the information comprising the session passcode for continuing the secure communication session.

2. The method of claim 1, wherein the autonomous network communication process comprises a headless browser, and the dynamic content is embedded in a web page.

3. The method of claim 1, wherein the separate communication channel is selected from the group consisting of an email address, an SMS address, and an authenticator application.

4. The method of claim 1, wherein automatically executing the process for receiving the information comprises accessing the separate communication channel registered to the human user, analyzing a message from a source associated with the dynamic content, and distinguishing the session passcode in the message.

5. The method of claim 1, wherein the information further comprises a response to a CAPTCHA challenge and extracting the context information further comprises identifying a type of the CAPTCHA challenge.

6. The method of claim 5, wherein automatically executing the process for receiving the information comprises sending the CAPTCHA challenge to an external resource and receiving a response to the CAPTCHA challenge from the external resource.

7. The method of claim 6, wherein providing the information comprises sending the CAPTCHA response to the network node.

8. An apparatus for controlling an autonomous network communication process, comprising at least one processor coupled to a memory and to an interface for network communications, the memory holding program instructions that when executed by the at least one processor cause the apparatus to perform:
- initiating an automatic algorithm for an interactive communication session with a network node for secure communication with a human user;
- receiving from the network node a dynamic content including a request for input of information comprising a multi-factor authentication session passcode;
- extracting context information indicating a process for receiving the information needed for continuing the communication session, wherein the information comprises the session passcode, and the extracting further comprises automatically identifying a separate communication channel registered to the human user for receiving the session passcode;
- automatically executing the process for receiving the information comprising the session passcode; and
- automatically providing to the network node the information comprising the session passcode for continuing the secure communication session.

9. The apparatus of claim 8, wherein the program instructions are further configured for performing an aspect of the autonomous network communication process by a headless browser, wherein the dynamic content is embedded in a web page.

10. The apparatus of claim 8, wherein the program instructions are further configured for selecting the separate communication channel from the group consisting of an email address, an SMS address, and an authenticator application.

11. The apparatus of claim 8, wherein the program instructions are further configured for automatically executing the process for receiving the information at least in part by accessing the separate communication channel registered to the human user, analyzing a message from a source associated with the dynamic content, and distinguishing the session passcode in the message.

12. The apparatus of claim 8, wherein the program instructions are further configured for receiving the information further comprising a response to a CAPTCHA challenge and extracting the context information at least in part by identifying a type of the CAPTCHA challenge.

13. The apparatus of claim 12, wherein the program instructions are further configured for automatically executing the process for receiving the information at least in part by sending the CAPTCHA challenge to an external resource and receiving a response to the CAPTCHA challenge from the external resource, and providing the information at least in part by sending the CAPTCHA response to the network node.

14. An apparatus for controlling an autonomous network communication process, comprising:
- means for initiating an automatic algorithm for an interactive communication session with a network node for secure communication with a human user;
- means for receiving from the network node a dynamic content including a request for input of information comprising a multi-factor authentication session passcode;
- means for extracting context information indicating a process for receiving the information needed for continuing the communication session, wherein the information comprises the session passcode, and the extracting further comprises automatically identifying a separate communication channel registered to the human user for receiving the session passcode;
- means for automatically executing the process for receiving the information comprising the session passcode; and
- means for automatically providing to the network node the information comprising the session passcode for continuing the secure communication session.

* * * * *